(12) United States Patent
Zhu et al.

(10) Patent No.: US 10,306,408 B2
(45) Date of Patent: May 28, 2019

(54) POSITIONING METHOD, POSITIONING SERVER, AND POSITIONING SYSTEM

(71) Applicant: Huawei Technologies Co., Ltd., Shenzhen (CN)

(72) Inventors: Wei Zhu, Shanghai (CN); Jie Cui, Shenzhen (CN); Anjian Li, Beijing (CN); Jiantao Xue, Beijing (CN); Hong Li, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/804,200

(22) Filed: Nov. 6, 2017

(65) Prior Publication Data
US 2018/0063678 A1    Mar. 1, 2018

Related U.S. Application Data

(63) Continuation of application No. PCT/CN2015/078415, filed on May 6, 2015.

(51) Int. Cl.
*H04W 4/23* (2018.01)
*H04W 4/02* (2018.01)
(Continued)

(52) U.S. Cl.
CPC .......... *H04W 4/023* (2013.01); *G01S 5/021* (2013.01); *H04W 56/001* (2013.01);
(Continued)

(58) Field of Classification Search
CPC .... H04W 4/023; H04W 56/00; H04W 64/003
(Continued)

(56) References Cited

U.S. PATENT DOCUMENTS

| 5,960,355 A | 9/1999 | Ekman et al. |
| 7,359,719 B1 | 4/2008 | Duffett-Smith et al. |

(Continued)

FOREIGN PATENT DOCUMENTS

| CN | 104168642 A | 11/2014 |
| CN | 104270814 A | 1/2015 |

(Continued)

OTHER PUBLICATIONS

3rd Generation Partnership Project; Technical Specification Group Radio Access Network; Evolved Universal Terrestrial Radio Access (E-UTRA); Base Station (BS) radio transmission and reception (Release 12), 3GPP TS 36.104 V12.7.0 (Mar. 2015), 155 pages.

*Primary Examiner* — Said M Elnoubi
(74) *Attorney, Agent, or Firm* — Slater Matsil, LLP

(57) ABSTRACT

Embodiments of the present invention provide a positioning method, a positioning server, and a positioning system. The positioning method includes: separately obtaining, by a positioning server, location coordinates of M positioning nodes; separately obtaining, by the positioning server, a reference signal time difference RSTD between an $i^{th}$ positioning node and an $(i+1)^{th}$ positioning node in the M positioning nodes and a $j^{th}$ mobile terminal in two mobile terminals; determining, by the positioning server, a relative RSTD according to the RSTD; and determining, by the positioning server, location coordinates of the two mobile terminals according to the relative RSTD and the location coordinates of the M positioning nodes.

8 Claims, 9 Drawing Sheets

(51) Int. Cl.
*H04W 64/00* (2009.01)
*H04W 56/00* (2009.01)
*G01S 5/02* (2010.01)
*G01S 5/06* (2006.01)

(52) U.S. Cl.
CPC ......... *H04W 64/00* (2013.01); *H04W 64/003* (2013.01); *G01S 5/06* (2013.01)

(58) Field of Classification Search
USPC ........................................................ 455/456
See application file for complete search history.

(56) References Cited

U.S. PATENT DOCUMENTS

| | | |
|---|---|---|
| 2009/0011775 A1 | 1/2009 | Niemenmaa et al. |
| 2009/0258658 A1 | 10/2009 | Edge et al. |
| 2012/0015667 A1 | 1/2012 | Woo et al. |
| 2012/0129551 A1 * | 5/2012 | Islam .................... G01S 5/0205 455/456.1 |

FOREIGN PATENT DOCUMENTS

| | | | |
|---|---|---|---|
| JP | H08146110 A | 6/1996 | |
| JP | 2000504838 A | 4/2000 | |
| JP | 2003501633 A | 1/2003 | |
| JP | 2009527965 A | 7/2009 | |
| JP | 2010078525 A | 4/2010 | |
| JP | 2011517260 A | 5/2011 | |
| WO | 9921028 A1 | 4/1999 | |
| WO | 0073814 A1 | 12/2000 | |
| WO | WO 0073814 A1 * | 12/2000 | ............. G01S 1/024 |
| WO | 2005051034 A1 | 6/2005 | |
| WO | WO 2005051034 A1 * | 6/2005 | ............. G01S 5/021 |
| WO | 2011124941 A1 | 10/2011 | |

* cited by examiner

POSITIONING METHOD, POSITIONING SERVER, AND POSITIONING SYSTEM

CROSS-REFERENCE TO RELATED APPLICATIONS

This application is a continuation of International Application No. PCT/CN2015/078415, filed on May 6, 2015, the disclosure of which is hereby incorporated by reference in its entirety.

TECHNICAL FIELD

The present invention relates to the field of wireless communications technologies, and in particular, to a positioning method, a positioning server, and a positioning system.

BACKGROUND

A positioning technology is a technology in which location information of a mobile terminal is obtained by using wireless communications network resources, to determine a geographical location of the mobile terminal.

In the prior art, two common positioning technologies are an uplink time difference of arrival (UTDOA) positioning method and an observed time difference of arrival (OTDOA) positioning method. In the UTDOA positioning method, a time of arrival (ToA) of a positioning signal sent by a mobile terminal is measured at each base station, a time difference of arrival, at the base stations, of the positioning signal, that is, a reference signal time difference (RSTD) is obtained according to the ToA, the RSTD is reported to a positioning server, and finally, the positioning server determines a location of the mobile terminal according to the RSTD. The OTDOA positioning method is similar to the UTDOA positioning method. A difference lies only in that, in the OTDOA positioning method, each base station sends a positioning signal, and a mobile terminal measures ToAs of the positioning signals and reports an RSTD.

In actual application, because a timing alignment error (TAE) exists between base stations in a system, local clocks of the base stations are generally not in complete synchronization. In this case, a measured RSTD not only includes a time difference of arrival, at different base stations, of a positioning signal, but also introduces a deviation between the local clocks of the base stations. This inevitably causes an error in final positioning calculation and causes a deviation in a positioning result.

In conclusion, in an existing positioning method, because the TAE is introduced during RSTD calculation, a deviation exists between a finally obtained positioning result and an actual location of a mobile terminal.

SUMMARY

Embodiments of the present invention provide a positioning method, a positioning server, and a positioning system, to eliminate a positioning error brought by a TAE, improve positioning precision, and accurately position multiple mobile terminals at a time.

To achieve the foregoing objectives, the embodiments of the present invention use the following technical solutions.

According to a first aspect, a positioning method is provided. The method includes separately obtaining, by a positioning server, location coordinates of M positioning nodes. The method also includes separately obtaining, by the positioning server, a reference signal time difference RSTD between an $i^{th}$ positioning node and an $(i+1)^{th}$ positioning node in the M positioning nodes and a $j^{th}$ mobile terminal in two mobile terminals, where M is an integer and M≥5, i is separately set to each of all integers ranging from 1 to M−1, and j is separately set to 1 or 2. The method also includes determining, by the positioning server, a relative RSTD according to the RSTD, where the relative RSTD indicates a difference between an RSTD between the $i^{th}$ positioning node and the $(i+1)^{th}$ positioning node and a first mobile terminal in the two mobile terminals and an RSTD between the $i^{th}$ positioning node and the $(i+1)^{th}$ positioning node and a second mobile terminal in the two mobile terminals. The method also includes determining, by the positioning server, location coordinates of the two mobile terminals according to the relative RSTD and the location coordinates of the M positioning nodes.

With reference to the first aspect, in a first possible implementation of the first aspect, the separately obtaining, by the positioning server, a reference signal time difference RSTD between an $i^{th}$ positioning node and an $(i+1)^{th}$ positioning node in the M positioning nodes and a $j^{th}$ mobile terminal in two mobile terminals includes: separately receiving, by the positioning server, times of arrival ToAs that are of uplink pilot signals and that are sent by the M positioning nodes, where the ToAs of the uplink pilot signals are obtained by the M positioning nodes by separately measuring the uplink pilot signals sent by the two mobile terminals; and determining, by the positioning server, an RSTD between the $i^{th}$ positioning node and the $(i+1)^{th}$ positioning node and the $j^{th}$ mobile terminal in the two mobile terminals according to the ToAs of the uplink pilot signals.

With reference to the first aspect, in a second possible implementation of the first aspect, the separately obtaining, by the positioning server, a reference signal time difference RSTD between an $i^{th}$ positioning node and an $(i+1)^{th}$ positioning node in the M positioning nodes and a $j^{th}$ mobile terminal in two mobile terminals includes: separately receiving, by the positioning server, an RSTD that is between the $i^{th}$ positioning node and the $(i+1)^{th}$ positioning node and the $j^{th}$ mobile terminal in the two mobile terminals and that is separately sent by the two mobile terminals, where the RSTD is obtained by the two mobile terminals by separately measuring downlink pilot signals sent by the M positioning nodes.

With reference to any one of the first aspect, the first possible implementation of the first aspect, or the second possible implementation of the first aspect, in a third possible implementation of the first aspect, the determining, by the positioning server, location coordinates of the two mobile terminals according to the relative RSTD and the location coordinates of the M positioning nodes includes: determining, by the positioning server, the location coordinates of the two mobile terminals according to the relative RSTD, the location coordinates of the M positioning nodes, and a preset positioning equation, where the preset positioning equation includes:

$$[\sqrt{(a_i-x_1)^2+(b_i-y_1)^2}-\sqrt{(a_{i+1}-x_1)^2+(b_{i+1}-y_1)^2}]-[\sqrt{(a_i-x_2)^2+(b_i-y_2)^2}-\sqrt{(a_{i+1}-x_2)^2+(b_{i+1}-y_2)^2}]=\text{RelativeRSTD}_{i,i+1}\times c,$$

where $(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, Relative $\text{RSTD}_{i,i+1}$ indicates the relative RSTD between the $i^{th}$ positioning node and the $(i+1)^{th}$ positioning node and the two mobile terminals, and c indicates a speed of light.

With reference to the first possible implementation of the first aspect, in a fourth possible implementation of the first aspect, before the separately receiving, by the positioning server, times of arrival ToAs that are of uplink pilot signals and that are sent by the M positioning nodes, the method further includes: separately sending, by the positioning server, a first message to the two mobile terminals, so that the two mobile terminals simultaneously send the uplink pilot signals to the M positioning nodes.

With reference to the fourth possible implementation of the first aspect, in a fifth possible implementation of the first aspect, before the separately sending, by the positioning server, a first message to the two mobile terminals, the method further includes: separately obtaining, by the positioning server, uplink pilot signal configurations of the two mobile terminals; and separately sending, by the positioning server, the uplink pilot signal configurations of the two mobile terminals to the M positioning nodes, so that the M positioning nodes receive the uplink pilot signals according to the uplink pilot signal configurations, and measure the uplink pilot signals.

With reference to the second possible implementation of the first aspect, in a sixth possible implementation of the first aspect, before the separately receiving, by the positioning server, an RSTD that is between the $i^{th}$ positioning node and the $(i+1)^{th}$ positioning node and the $j^{th}$ mobile terminal in the two mobile terminals and that is separately sent by the two mobile terminals, the method further includes: separately sending, by the positioning server, a second message to the M positioning nodes, so that the M positioning nodes simultaneously send the downlink pilot signals to the two mobile terminals.

According to a second aspect, a positioning server is provided. The server includes an obtaining unit and a processing unit. The obtaining unit is configured to separately obtain location coordinates of M positioning nodes, where M is an integer and M≥5. The obtaining unit is further configured to separately obtain a reference signal time difference RSTD between an $i^{th}$ positioning node and an $(i+1)^{th}$ positioning node in the M positioning nodes and a $j^{th}$ mobile terminal in two mobile terminals, where i is separately set to each of all integers ranging from 1 to M−1, and j is separately set to 1 or 2. The processing unit is configured to determine a relative RSTD according to the RSTD, where the relative RSTD indicates a difference between an RSTD between the $i^{th}$ positioning node and the $(i+1)^{th}$ positioning node and a first mobile terminal in the two mobile terminals and an RSTD between the $i^{th}$ positioning node and the $(i+1)^{th}$ positioning node and a second mobile terminal in the two mobile terminals. The processing unit is further configured to determine location coordinates of the two mobile terminals according to the relative RSTD and the location coordinates of the M positioning nodes.

With reference to the second aspect, in a first possible implementation of the second aspect, the obtaining unit is specifically configured to: separately receive times of arrival ToAs that are of uplink pilot signals and that are sent by the M positioning nodes, where the ToAs of the uplink pilot signals are obtained by the M positioning nodes by separately measuring the uplink pilot signals sent by the two mobile terminals; and determine an RSTD between the $i^{th}$ positioning node and the $(i+1)^{th}$ positioning node and the $j^{th}$ mobile terminal in the two mobile terminals according to the ToAs of the uplink pilot signals.

With reference to the second aspect, in a second possible implementation of the second aspect, the obtaining unit is specifically configured to: separately receive an RSTD that is between the $i^{th}$ positioning node and the $(i+1)^{th}$ positioning node and the $j^{th}$ mobile terminal in the two mobile terminals and that is separately sent by the two mobile terminals, where the RSTD is obtained by the two mobile terminals by separately measuring downlink pilot signals sent by the M positioning nodes.

With reference to any one of the second aspect, the first possible implementation of the second aspect, or the second possible implementation of the second aspect, in a third possible implementation of the second aspect, the processing unit is specifically configured to: determine the location coordinates of the two mobile terminals according to the relative RSTD, the location coordinates of the M positioning nodes, and a preset positioning equation, where the preset positioning equation includes:

$$[\sqrt{(a_i-x_1)^2+(b_i-y_1)^2}-\sqrt{(a_{i+1}-x_1)^2+(b_{i+1}-y_1)^2}]-[\sqrt{(a_i-x_2)^2+(b_i-y_2)^2}-\sqrt{(a_{i+1}-x_2)^2+(b_{i+1}-y_2)^2}]=\text{RelativeRSTD}_{i,i+1}\times c,$$

where $(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, RelativeRSTD$_{i,i+1}$ indicates the relative RSTD between the $i^{th}$ positioning node and the $(i+1)^{th}$ positioning node and the two mobile terminals, and c indicates a speed of light.

With reference to the first possible implementation of the second aspect, in a fourth possible implementation of the second aspect, the positioning server further includes a sending unit, where the sending unit is configured to: before the obtaining unit separately receives the times of arrival ToAs that are of the uplink pilot signals and that are sent by the M positioning nodes, separately send a first message to the two mobile terminals, so that the two mobile terminals simultaneously send the uplink pilot signals to the M positioning nodes.

With reference to the fourth possible implementation of the second aspect, in a fifth possible implementation of the second aspect, the obtaining unit is further configured to: before the sending unit separately sends the first message to the two mobile terminals, separately obtain uplink pilot signal configurations of the two mobile terminals; and the sending unit is further configured to separately send the uplink pilot signal configurations of the two mobile terminals to the M positioning nodes, so that the M positioning nodes receive the uplink pilot signals according to the uplink pilot signal configurations, and measure the uplink pilot signals.

With reference to the second possible implementation of the second aspect, in a sixth possible implementation of the second aspect, the positioning server further includes a sending unit, where the sending unit is configured to separately send a second message to the M positioning nodes, so that the M positioning nodes simultaneously send the downlink pilot signals to the two mobile terminals.

According to a third aspect, a positioning system is provided, including the positioning server according to any one of the second aspect or the first to the sixth possible implementations of the second aspect, M positioning nodes, and N mobile terminals, where M and N are integers, M≥5, and N≥2.

Based on the foregoing solutions, when the two mobile terminals are introduced, the relative RSTD is introduced by performing a subtraction operation between the actually measured RSTDs of the two mobile terminals, to eliminate the TAE. Then, positioning calculation is performed on the mobile terminals based on the relative RSTD, to eliminate the positioning error brought by the TAE, and improve the positioning precision. In addition, the locations of the two mobile terminals may be obtained after a once-through operation. Further, when multiple (>2) mobile terminals exist in the system, multiple operations are performed on all combinations of two of the multiple mobile terminals, so as to position all the multiple mobile terminals in the system.

In conclusion, according to the positioning method, the positioning server, and the positioning system that are provided in the embodiments of the present invention, the positioning error brought by the TAE can be eliminated, the positioning precision can be improved, and the multiple mobile terminals can be accurately positioned at a time.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
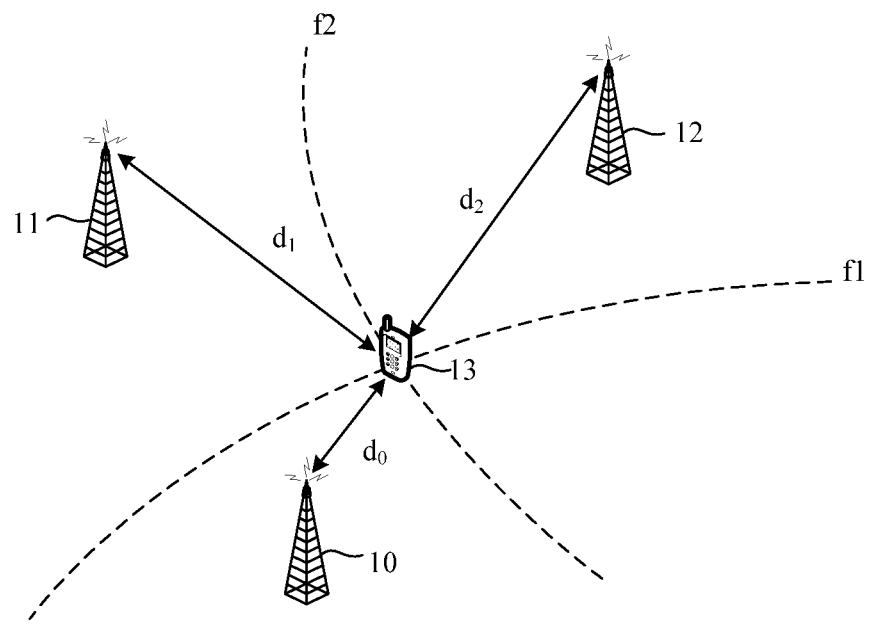
FIG. 1 is a schematic principle diagram of UTDOA and OTDOA positioning methods.

For ease of understanding of the embodiments of the present invention, the following briefly introduces principles of UTDOA and OTDOA positioning methods with reference to FIG. 1.

As shown in FIG. 1, it is assumed that three base stations: a base station 10, a base station 11, and a base station 12 exist in a system, and distances between a mobile terminal and the base station 10, the base station 11, and the base station 12 are respectively $d_0$, $d_1$, and $d_2$. It can be learned from a definition of a hyperbola that points whose differences of distances to two fixed points are a constant value constitute a hyperbola. Points whose differences of distances to the base station 10 and the base station 11 are $d_1-d_0$ may constitute a hyperbola f1, and points whose differences of distances to the base station 11 and the base station 12 are $d_2-d_1$ may constitute a hyperbola f2. In this case, an intersection point of the two hyperbolas is a location of a mobile terminal 13. Specifically, (the UTDOA positioning method is used as an example herein), a time (that is, a time of arrival) of an arrival, at each base station for receiving, of a positioning signal sent by the mobile terminal is measured at each base station, and a subtraction operation is performed between times of arrival measured by the base stations. Then, a time difference (that is, an RSTD) of arrival, at the base stations, of the positioning signal may be obtained. The RSTD is multiplied by a speed of light. Then, the time difference of arrival, at the different base stations, of the positioning signal is mapped to a difference of distances between the mobile terminal and the different base stations. Finally, the location of the mobile terminal may be obtained by means of calculation according to the foregoing hyperbola model.

It should be noted that, in an ideal case in which complete synchronization is implemented between the base stations, the accurate location of the mobile terminal may be obtained according to the foregoing steps. However, in reality, although time synchronization is implemented between the base stations in the system, a timing alignment error still exists between the base stations. As a result, local clocks of the base stations are generally not in complete synchronization. In this case, the measured RSTD not only includes the time difference of arrival, at the base stations, of the positioning signal, but also introduces a deviation between the local clocks of the base stations. This inevitably causes an error in final positioning calculation and causes a deviation in a positioning result.

It should be noted that, the embodiments of the present invention may be applied to a mobile communications system, such as an LTE mobile communications system, a CDMA2000 mobile communications system, or a GSM mobile communications system. This is not specifically limited in the embodiments of the present invention.

Embodiment 1

Figure 2:
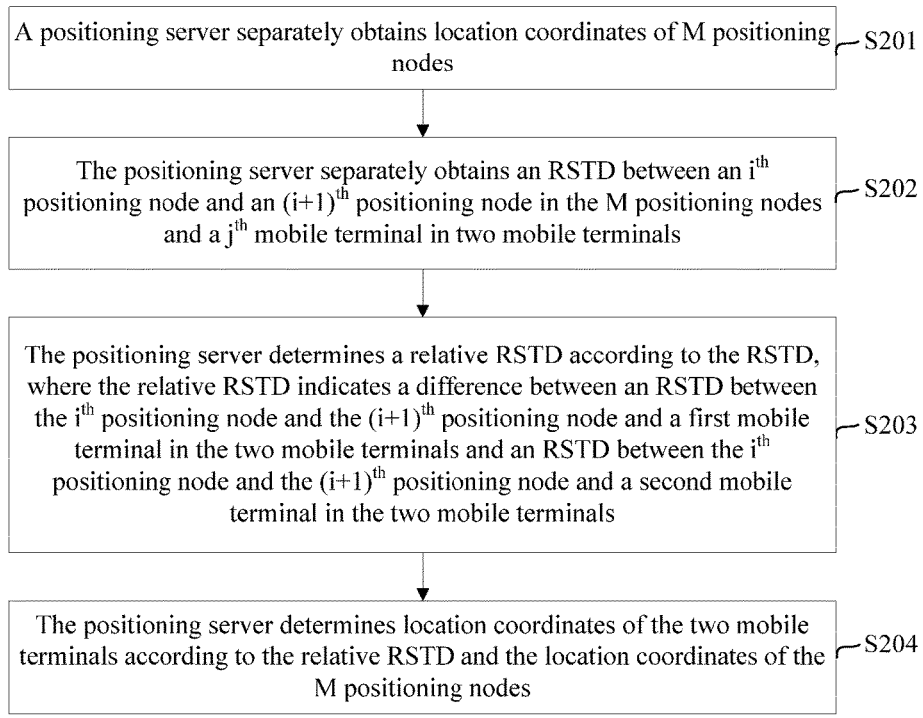
FIG. 2 is a schematic flowchart of a positioning method according to an embodiment of the present invention.

This embodiment of the present invention provides a positioning method. Specifically, as shown in FIG. 2, the positioning method includes the following steps.

S201. A positioning server separately obtains location coordinates of M positioning nodes.

S202. The positioning server separately obtains an RSTD between an $i^{th}$ positioning node and an $(i+1)^{th}$ positioning node in the M positioning nodes and a $j^{th}$ mobile terminal in two mobile terminals.

M is an integer and M≥5, i is separately set to each of all integers ranging from 1 to M−1, and j is separately set to 1 or 2.

The positioning server may be an independent network node or may be located inside another network node. That is, the positioning server may be logical or physical. Specifically, in a second generation (2nd Generation, 2G)/third generation (3rd Generation, 3G) mobile communications technology, the positioning server is a serving mobile location center (SMLC). In a Long Term Evolution (LTE) technology, the positioning server is an enhanced serving mobile location center (E-SMLC), and may be specifically a network node of an access network or a core network node. This is not specifically limited in this embodiment of the present invention.

The positioning node is a network node of an access network, and may be specifically a NodeB, an eNodeB, a family NodeB, a family eNodeB, or the like. This is not specifically limited in this embodiment of the present invention.

The mobile terminal may be specifically a communications apparatus, such as a mobile phone, a cellular phone, or a notebook computer that has a wireless access capability. This is not specifically limited in this embodiment of the present invention.

For example, it is assumed that five positioning nodes (that is, M=5) and two mobile terminals exist in a system, the positioning server needs to obtain location coordinates of the five positioning nodes, and separately obtain RSTDs between two neighboring positioning nodes in the five positioning nodes and the two mobile terminals, that is, an RSTD ($RSTD_{12,1}$) between a first positioning node and a second positioning node and a first mobile terminal, an RSTD ($RSTD_{23,1}$) between the second positioning node and a third positioning node and the first mobile terminal, an RSTD ($RSTD_{34,1}$) between the third positioning node and a fourth positioning node and the first mobile terminal, an RSTD ($RSTD_{45,1}$) between the fourth positioning node and a fifth positioning node and the first mobile terminal, an RSTD ($RSTD_{12,2}$) between the first positioning node and the second positioning node and a second mobile terminal, an RSTD ($RSTD_{23,2}$) between the second positioning node and the third positioning node and the second mobile terminal, an RSTD ($RSTD_{34,2}$) between the third positioning node and the fourth positioning node and the second mobile terminal, and an RSTD ($RSTD_{45,2}$) between the fourth positioning node and the fifth positioning node and the second mobile terminal. Certainly, an RSTD between two non-neighboring positioning nodes and a mobile terminal may be obtained, and then an RSTD between two neighboring positioning nodes and the mobile terminal is obtained by means of calculation according to the obtained RSTD. For example, the RSTD ($RSTD_{12,1}$) between the first positioning node and the second positioning node and the first mobile terminal, an RSTD ($RSTD_{13,1}$) between the first positioning node and the third positioning node and the first mobile terminal, the RSTD ($RSTD_{12,2}$) between the first positioning node and the second positioning node and the second mobile terminal, and an RSTD ($RSTD_{13,2}$) between the first positioning node and the third positioning node and the second mobile terminal may be first obtained, the $RSTD_{23,1}$ and the $RSTD_{23,2}$ are respectively obtained by means of calculation according to the $RSTD_{12,1}$ and the $RSTD_{13,1}$, and the $RSTD_{12,2}$ and the $RSTD_{13,1}$, and then a relative RSTD ($RelativeRSTD_{23}$) between the second positioning node and the third positioning node and the two mobile terminals is obtained according to the $RSTD_{23,1}$ and the $RSTD_{23,2}$. This is not specifically limited in this embodiment of the present invention.

S203. The positioning server determines a relative RSTD according to the RSTD, where the relative RSTD indicates a difference between an RSTD between the $i^{th}$ positioning node and the $(i+1)^{th}$ positioning node and a first mobile terminal in the two mobile terminals and an RSTD between the $i^{th}$ positioning node and the $(i+1)^{th}$ positioning node and a second mobile terminal in the two mobile terminals.

Specifically, the positioning server obtains the relative RSTD by performing a subtraction operation between the RSTD between the $i^{th}$ positioning node and the $(i+1)^{th}$ positioning node and the first mobile terminal and the RSTD between the $i^{th}$ positioning node and the $(i+1)^{th}$ positioning node and the second mobile terminal.

For example, based on the foregoing example, the positioning server needs to sequentially perform a subtraction operation between the $RSTD_{12,1}$ and the $RSTD_{12,2}$ to obtain a relative RSTD ($RelativeRSTD_{12}$) between the first positioning node and the second positioning node and the two mobile terminals, perform a subtraction operation between the $RSTD_{23,1}$ and the $RSTD_{23,2}$ to obtain a relative RSTD ($RelativeRSTD_{23}$) between the second positioning node and the third positioning node and the two mobile terminals, perform a subtraction operation between the $RSTD_{34,1}$ and the $RSTD_{34,2}$ to obtain a relative RSTD ($RelativeRSTD_{34}$) between the third positioning node and the fourth positioning node and the two mobile terminals, and perform a subtraction operation between the $RSTD_{45,1}$ and the $RSTD_{45,2}$ to obtain a relative RSTD ($RelativeRSTD_{45}$) between the fourth positioning node and the fifth positioning node and the two mobile terminals.

S204. The positioning server determines location coordinates of the two mobile terminals according to the relative RSTD and the location coordinates of the M positioning nodes.

It should be noted that, in the positioning method provided in this embodiment of the present invention, step S201 and step S202 are not necessarily performed in a definite order. As shown in FIG. 2, step S201 may be performed before step S202. Alternatively, step S202 may be performed before step S201. This is not specifically limited in this embodiment of the present invention.

Figure 3A:
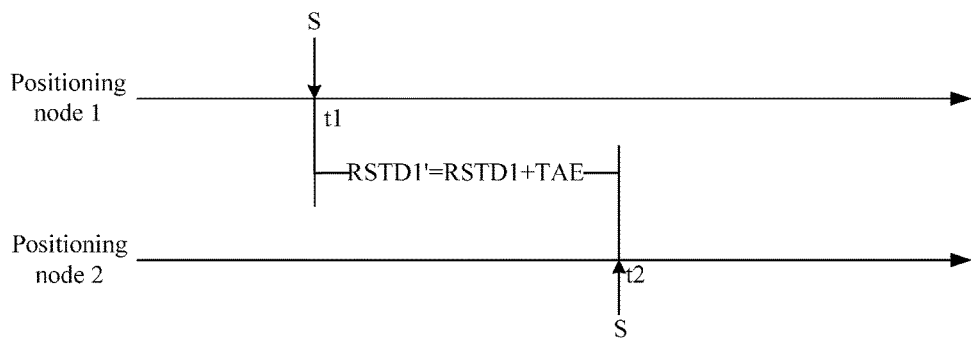
FIG. 3(a) is a schematic diagram illustrating a timing alignment error.

As mentioned above, in the prior art, because of existence of a timing alignment error, an actually measured RSTD between two positioning nodes and a mobile terminal not only includes a time difference of arrival, at the two positioning nodes, of a positioning signal, but also introduces a deviation between local clocks of the two positioning nodes. For details, refer to FIG. 3(a). In the figure, t1 is a moment at which a positioning signal sent by a mobile terminal is received by a positioning node 1, t2 is a moment at which the positioning signal sent by the mobile terminal is received by a positioning node 2, and $RSTD_1$ is an actually measured RSTD (that is, a difference between t1 and t2). Because a timing alignment error still exists between the positioning node 1 and the positioning node 2 between time synchronization is implemented, $RSTD_1'=t2-t1=RSTD_1+TAE$. $RSTD_1$ indicates a real RSTD, and TAE indicates the timing alignment error between the positioning node 1 and the positioning node 2.

Figure 3B:
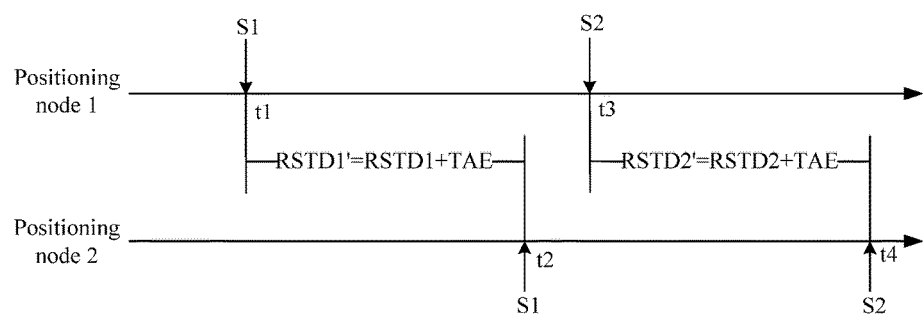
FIG. 3(b) is a schematic principle diagram of eliminating a timing alignment error by using a positioning method according to an embodiment of the present invention.

However, in the positioning method provided in this embodiment of the present invention, when the two mobile terminals are introduced, the relative RSTD is introduced by performing a subtraction operation between the actually measured RSTDs of the two mobile terminals, to eliminate an error brought by a TAE to positioning calculation. For details, refer to FIG. 3(b). In the figure, t1 is a moment at which a positioning signal S1 sent by a mobile terminal A is received by a positioning node 1, t2 is a moment at which the positioning signal S1 sent by the mobile terminal A is received by a positioning node 2, t3 is a moment at which a positioning signal S2 sent by a mobile terminal B is received by the positioning node 1, t4 is a moment at which the positioning signal S2 sent by the mobile terminal B is received by the positioning node 2, and $RSTD_1'$ and $RSTD_2'$ are actually measured RSTDs. It can be learned from the foregoing descriptions that $RSTD_1'=RSTD_1+TAE$ and $RSTD_2' = RSTD_2 + TAE$. A relative RSTD may be obtained by performing a subtraction operation between $RSTD_1'$ and $RSTD_2'$:
RelativeRSTD = $RSTD_1' - RSTD_2' = (RSTD_1 + TAE) - (RSTD_2 + TAE) = RSTD_1 - RSTD_2$. In view of this, the relative RSTD obtained after the subtraction operation is performed is a difference between real RSTDs, and no longer includes a TAE. Therefore, calculating a location of a mobile terminal based on the relative RSTD can eliminate the positioning error brought by the TAE, so that positioning precision is improved.

In addition, it should be noted that, in the positioning method provided in this embodiment of the present invention, the location coordinates of the at least five positioning nodes and RSTDs between the at least five positioning nodes and the two mobile terminals need to be obtained, to position the two mobile terminals. A person of ordinary skill in the present invention may understand that a larger quantity of the positioning nodes (that is, a larger value of M) indicates higher positioning precision.

It should be noted that the positioning method provided in this embodiment of the present invention is not limited to a scenario of two mobile terminals, and may be applied to a scenario of more than two mobile terminals. It can be easily understood that, when multiple (>2) mobile terminals exist in a system, the positioning method provided in this embodiment of the present invention is repeatedly implemented for all combinations of two of the mobile terminals, so as to position all the multiple mobile terminals in the system. This is not specifically limited in this embodiment of the present invention.

Preferably, in the positioning method provided in this embodiment of the present invention, that the positioning server determines location coordinates of the two mobile terminals according to the relative RSTD and the location coordinates of the M positioning nodes may include: determining, by the positioning server, the location coordinates of the two mobile terminals according to the relative RSTD, the location coordinates of the M positioning nodes, and a preset positioning equation.

The preset positioning equation includes a formula (1):

$$[\sqrt{(a_i-x_1)^2+(b_i-y_1)^2} - \sqrt{(a_{i+1}-x_1)^2+(b_{i+1}-y_1)^2}] - [\sqrt{(a_i-x_2)^2+(b_i-y_2)^2} - \sqrt{(a_{i+1}-x_2)^2+(b_{i+1}-y_2)^2}] = RelativeRSTD_{i,i+1} \times c,$$

formula (1), where $(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, $RelativeRSTD_{i, i+1}$ indicates the relative RSTD between the $i^{th}$ positioning node and the $(i+1)^{th}$ positioning node and the two mobile terminals, and c indicates a speed of light.

The formula (1) may be obtained according to the relative RSTD. A specific deduction process is as follows.

As mentioned above, a formula (2) may be obtained according to the relative RSTD:

$$RelativeRSTD_{i,i+1} = RSTD'_{(i,i+1),1} - RSTD'_{(i,i+1),2} = RSTD_{(i,i+1),1} - RSTD_{(i,i+1),2} \quad \text{formula (2)}$$

Further, a formula (3) and a formula (4) may be obtained according to a definition of an RSTD:

$$RSTD_{(i,i+1),1} \times c = \sqrt{(a_i-x_1)^2+(b_i-y_1)^2} - \sqrt{(a_{i+1}-x_1)^2+(b_{i+1}-y_1)^2} \quad \text{formula (3)}$$

$$RSTD_{(i,i+1),2} \times c = \sqrt{(a_i-x_2)^2+(b_i-y_2)^2} - \sqrt{(a_{i+1}-x_2)^2+(b_{i+1}-y_2)^2} \quad \text{formula (4)}$$

The formula (1) may be obtained by performing a subtraction operation between the formula (3) and the formula (4):

$$(RSTD_{(i,i+1),1} - RSTD_{(i,i+1),2}) \times c = RelativeRSTD_{i,i+1} \times c$$
$$= \left[\sqrt{(a_i - x_1)^2 + (b_i - y_1)^2} - \sqrt{(a_{i+1} - x_1)^2 + (b_{i+1} - y_1)^2}\right] -$$
$$\left[\sqrt{(a_i - x_2)^2 + (b_i - y_2)^2} - \sqrt{(a_{i+1} - x_2)^2 + (b_{i+1} - y_2)^2}\right],$$

where meanings of the letters are the same as those described above.

For example, it is assumed that there are five positioning nodes and two mobile terminals in a system, a positioning equation is specifically equations shown in formula (5).

$$\begin{cases} \left[\sqrt{(a_1-x_1)^2+(b_1-y_1)^2} - \sqrt{(a_2-x_1)^2+(b_2-y_1)^2}\right] - \\ \left[\sqrt{(a_1-x_2)^2+(b_1-y_2)^2} - \sqrt{(a_2-x_2)^2+(b_2-y_2)^2}\right] = RelativeRSTD_{1,2} \times c \\ \left[\sqrt{(a_2-x_1)^2+(b_2-y_1)^2} - \sqrt{(a_3-x_1)^2+(b_3-y_1)^2}\right] - \\ \left[\sqrt{(a_2-x_2)^2+(b_2-y_2)^2} - \sqrt{(a_3-x_2)^2+(b_3-y_2)^2}\right] = RelativeRSTD_{2,3} \times c \\ \left[\sqrt{(a_3-x_1)^2+(b_3-y_1)^2} - \sqrt{(a_4-x_1)^2+(b_4-y_1)^2}\right] - \\ \left[\sqrt{(a_3-x_2)^2+(b_3-y_2)^2} - \sqrt{(a_4-x_2)^2+(b_4-y_2)^2}\right] = RelativeRSTD_{3,4} \times c \\ \left[\sqrt{(a_4-x_1)^2+(b_4-y_1)^2} - \sqrt{(a_5-x_1)^2+(b_5-y_1)^2}\right] - \\ \left[\sqrt{(a_4-x_2)^2+(b_4-y_2)^2} - \sqrt{(a_5-x_2)^2+(b_5-y_2)^2}\right] = RelativeRSTD_{4,5} \times c \end{cases} \quad \text{formula (5)}$$

In a possible implementation, in step S202, that the positioning server separately obtains an RSTD between an $i^{th}$ positioning node and an $(i+1)^{th}$ positioning node in the M positioning nodes and a $j^{th}$ mobile terminal in two mobile terminals may specifically include: separately receiving, by the positioning server, ToAs that are of uplink pilot signals and that are sent by the M positioning nodes, where the ToAs of the uplink pilot signals are obtained by the M positioning nodes by separately measuring the uplink pilot signals sent by the two mobile terminals; and determining, by the positioning server, an RSTD between the $i^{th}$ positioning node and the $(i+1)^{th}$ positioning node and the $j^{th}$ mobile terminal in the two mobile terminals according to the ToAs of the uplink pilot signals.

That is, the two mobile terminals simultaneously send different positioning signals (uplink pilot signals), and the multiple positioning nodes receive and measure the positioning signals sent by the mobile terminals, to obtain the ToAs of the positioning signals and report the ToAs to the positioning server. Then, the positioning server calculates the RSTDs between the different positioning nodes and the mobile terminals according to the ToAs reported by the multiple positioning nodes.

Preferably, before the separately receiving, by the positioning server, ToAs that are of uplink pilot signals and that are sent by the M positioning nodes, the method may further include: separately sending, by the positioning server, a first message to the two mobile terminals, so that the two mobile terminals simultaneously send the uplink pilot signals to the M positioning nodes.

That is, the positioning server notifies the mobile terminals of a specific time to send an uplink pilot signal. This is not specifically limited in this embodiment of the present invention.

Preferably, before the separately sending, by the positioning server, a first message to the two mobile terminals, the method may further include: separately obtaining, by the positioning server, uplink pilot signal configurations of the two mobile terminals; and separately sending, by the positioning server, the uplink pilot signal configurations of the two mobile terminals to the M positioning nodes, so that the M positioning nodes receive the uplink pilot signals according to the uplink pilot signal configurations, and measure the uplink pilot signals.

Specifically, the positioning server may separately send a request message to serving base stations of the two mobile terminals, to request to obtain the uplink pilot signal configurations of the two mobile terminals. This is not specifically limited in this embodiment of the present invention.

In another possible implementation, in step S202, that the positioning server separately obtains an RSTD between an $i^{th}$ positioning node and an $(i+1)^{th}$ positioning node in the M positioning nodes and a $j^{th}$ mobile terminal in two mobile terminals may specifically include: separately receiving, by the positioning server, an RSTD that is between the $i^{th}$ positioning node and the $(i+1)^{th}$ positioning node and the $j^{th}$ mobile terminal in the two mobile terminals and that is separately sent by the two mobile terminals, where the RSTD is obtained by the two mobile terminals by separately measuring downlink pilot signals sent by the M positioning nodes.

That is, the multiple positioning nodes simultaneously send different positioning signals (downlink pilot signals), and the mobile terminals receive and measure the positioning signals sent by the different positioning nodes, to obtain the RSTDs between the different positioning nodes and the mobile terminals and report the RSTDs to the positioning server.

Preferably, before the separately receiving, by the positioning server, an RSTD that is between the $i^{th}$ positioning node and the $(i+1)^{th}$ positioning node and the $j^{th}$ mobile terminal in the two mobile terminals and that is separately sent by the two mobile terminals, the method may further include: separately sending, by the positioning server, a second message to the M positioning nodes, so that the M positioning nodes simultaneously send the downlink pilot signals to the two mobile terminals.

That is, the positioning server notifies the positioning nodes of a specific time to send a downlink pilot signal. This is not specifically limited in this embodiment of the present invention.

Based on the positioning method provided in this embodiment of the present invention, the positioning server first separately obtains the location coordinates of the M positioning nodes, and separately obtains the RSTD between the $i^{th}$ positioning node and the $(i+1)^{th}$ positioning node in the M positioning nodes and the $j^{th}$ mobile terminal in the two mobile terminals; then determines the relative RSTD according to the RSTD; and finally determines the location coordinates of the two mobile terminals according to the relative RSTD and the location coordinates of the M positioning nodes.

In the positioning method provided in this embodiment of the present invention, when the two mobile terminals are introduced, the relative RSTD is introduced by performing a subtraction operation between the actually measured RSTDs of the two mobile terminals, to eliminate the TAE. Then, the positioning calculation is performed on the mobile terminals based on the relative RSTD, to eliminate the positioning error brought by the TAE, and improve the positioning precision. In addition, the locations of the two mobile terminals may be obtained after a once-through operation. Further, when multiple (>2) mobile terminals exist in the system, the positioning method provided in this embodiment of the present invention is repeatedly implemented for all combinations of two of the multiple mobile terminals, so as to position all the multiple mobile terminals in the system.

In conclusion, according to the positioning method provided in this embodiment of the present invention, the positioning error brought by the TAE can be eliminated, the positioning precision can be improved, and the multiple mobile terminals can be accurately positioned at a time.

Embodiment 2

Figure 4A:
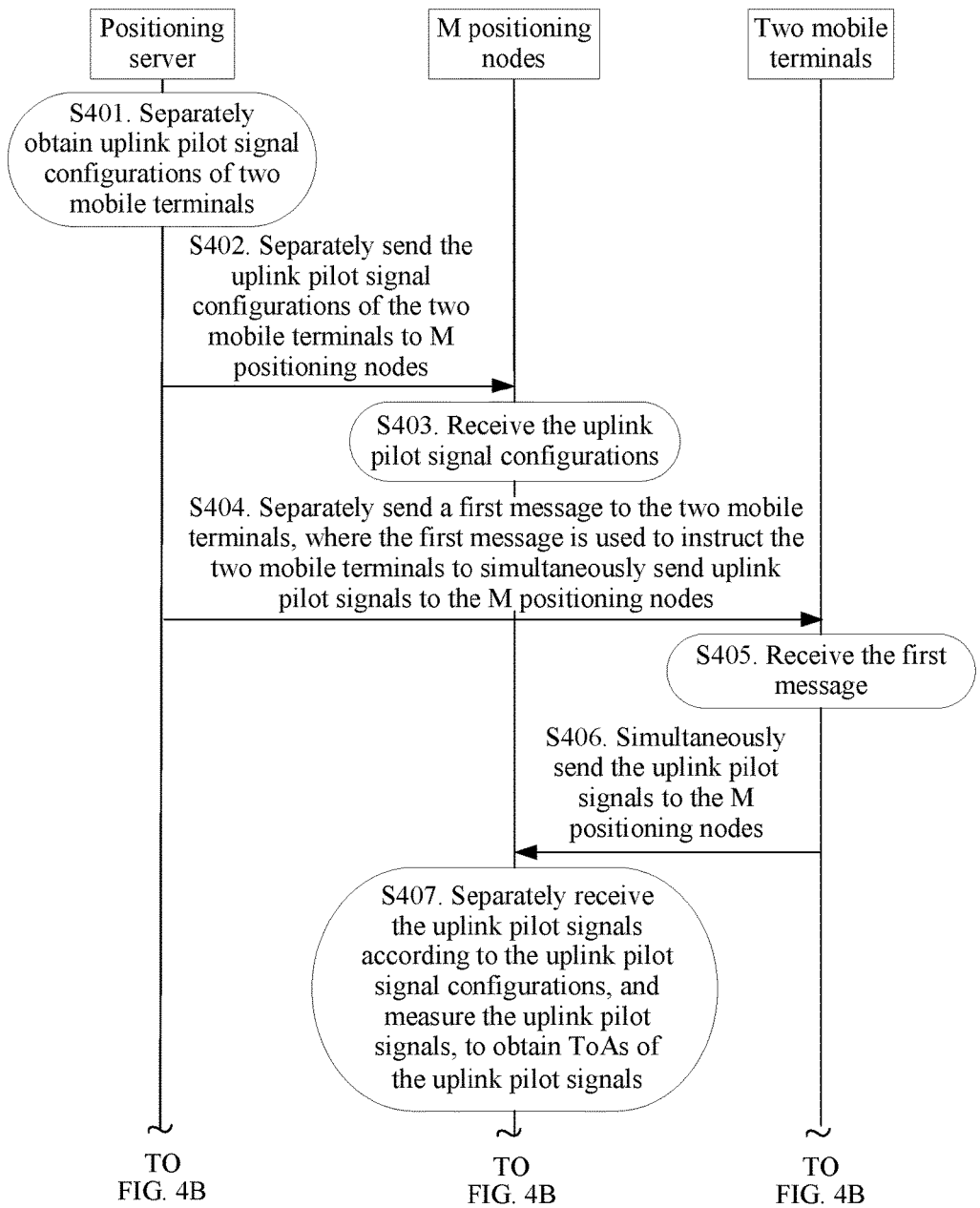
FIG. 4A and FIG. 4B are a schematic interaction diagram of a positioning method according to an embodiment of the present invention.
Figure 4B:
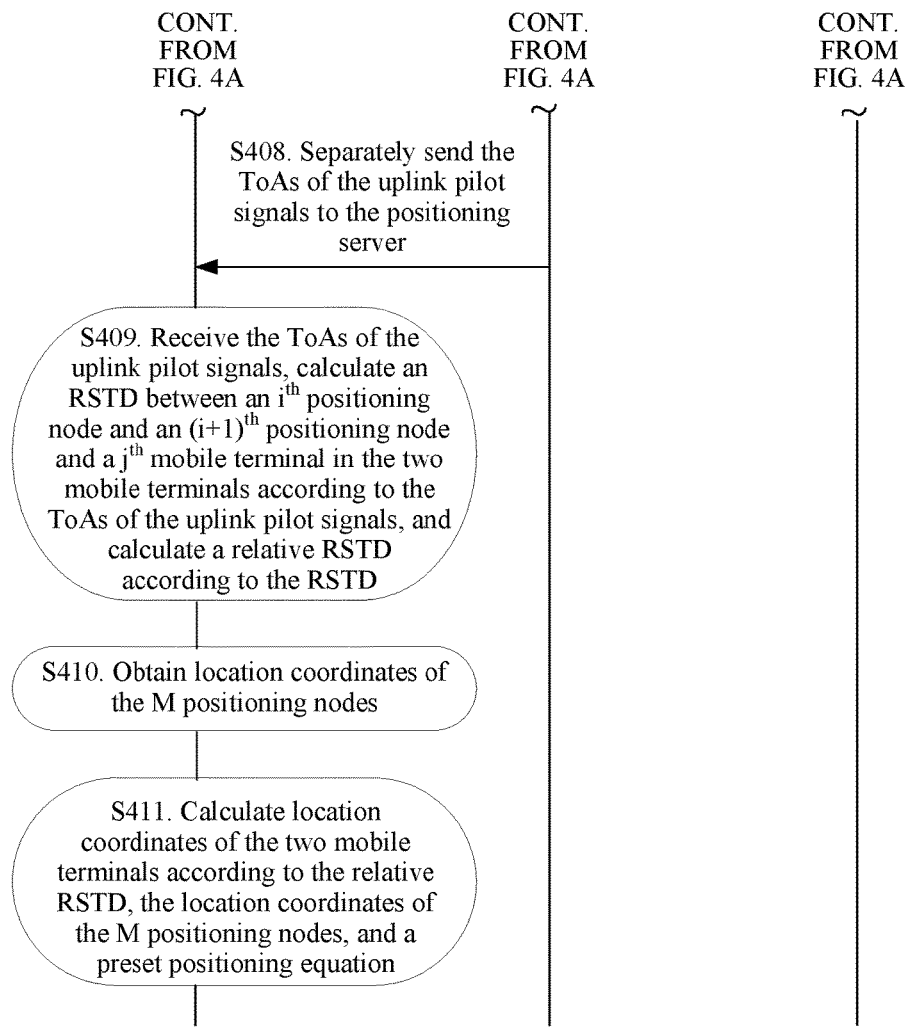

This embodiment of the present invention provides a positioning method. Specifically, as shown in FIG. 4A and FIG. 4B, the method includes the following steps.

S401. A positioning server separately obtains uplink pilot signal configurations of the two mobile terminals.

S402. The positioning server separately sends the uplink pilot signal configurations of the two mobile terminals to M positioning nodes.

M is an integer and M≥5.

S403. The M positioning nodes receive the uplink pilot signal configurations.

S404. The positioning server separately sends a first message to the two mobile terminals, where the first message is used to instruct the two mobile terminals to simultaneously send uplink pilot signals to the M positioning nodes.

S405. The two mobile terminals receive the first message.

S406. The two mobile terminals simultaneously send the uplink pilot signals to the M positioning nodes.

S407. The M positioning nodes separately receive the uplink pilot signals according to the uplink pilot signal configurations, and measure the uplink pilot signals, to obtain ToAs of the uplink pilot signals.

S408. The M positioning nodes separately send the ToAs of the uplink pilot signals to the positioning server.

S409. The positioning server receives the ToAs that are of the uplink pilot signals and that are sent by the M positioning nodes, calculates an RSTD between the $i^{th}$ positioning node and the $(i+1)^{th}$ positioning node and a $j^{th}$ mobile terminal in the two mobile terminals according to the ToAs of the uplink pilot signals, and calculates a relative RSTD according to the RSTD.

i is separately set to each of all integers ranging from 1 to M−1, and j is separately set to 1 or 2.

S410. The positioning server obtains location coordinates of the M positioning nodes.

S411. The positioning server calculates location coordinates of the two mobile terminals according to the relative RSTD, the location coordinates of the M positioning nodes, and a preset positioning equation.

The preset positioning equation includes:

$$[\sqrt{(a_i-x_1)^2+(b_i-y_1)^2}-\sqrt{(a_{i+1}-x_1)^2+(b_{i+1}-y_1)^2}]-[\sqrt{(a_i-x_2)^2+(b_i-y_2)^2}-\sqrt{(a_{i+1}-x_2)^2+(b_{i+1}-y_2)^2}]=\text{RelativeRSTD}_{i,i+1}\times c,$$

where $(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, RelativeRSTD$_{i, i+1}$ indicates the relative RSTD between the $i^{th}$ positioning node and the $(i+1)^{th}$ positioning node and the two mobile terminals, and c indicates a speed of light.

In the positioning method provided in this embodiment of the present invention, when the two mobile terminals are introduced, the relative RSTD is introduced by performing a subtraction operation between actually measured RSTDs of the two mobile terminals, to eliminate a TAE. Then, positioning calculation is performed on the mobile terminals based on the relative RSTD, to eliminate a positioning error brought by the TAE, and improve positioning precision. In addition, the locations of the two mobile terminals may be obtained after a once-through operation. Further, when multiple (>2) mobile terminals exist in a system, the positioning method provided in this embodiment of the present invention is repeatedly implemented for all combinations of two of the multiple mobile terminals, so as to position all the multiple mobile terminals in the system.

In conclusion, according to the positioning method provided in this embodiment of the present invention, the positioning error brought by the TAE can be eliminated, the positioning precision can be improved, and the multiple mobile terminals can be accurately positioned at a time.

Embodiment 3

Figure 5A:
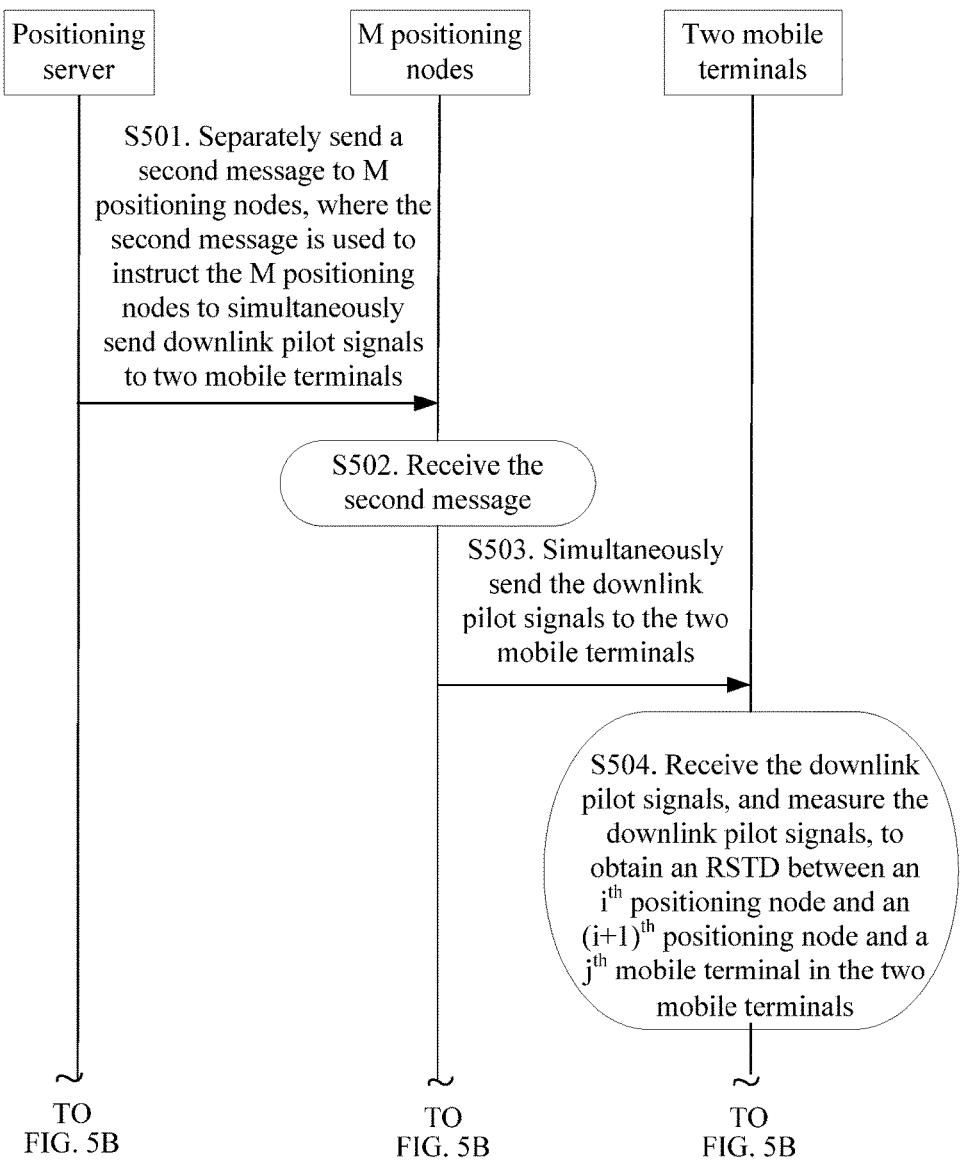
FIG. 5A and FIG. 5B are a schematic interaction diagram of another positioning method according to an embodiment of the present invention.
Figure 5B:
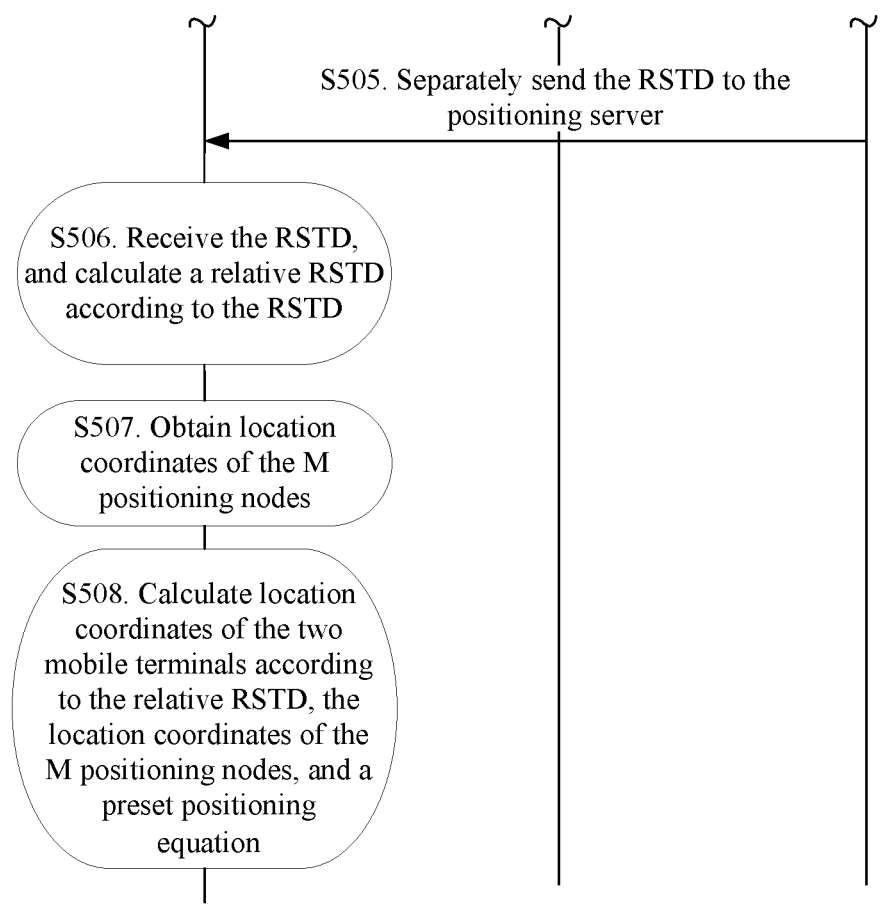

This embodiment of the present invention provides a positioning method. Specifically, as shown in FIG. 5A and FIG. 5B, the method includes the following steps.

S501. A positioning server separately sends a second message to M positioning nodes, where the second message is used to instruct the M positioning nodes to simultaneously send downlink pilot signals to two mobile terminals.

M is an integer and M≥5.

S502. The M positioning nodes receive the second message.

S503. The M positioning nodes simultaneously send the downlink pilot signals to the two mobile terminals.

S504. The two mobile terminals receive the downlink pilot signals, and measure the downlink pilot signals, to obtain an RSTD between the $i^{th}$ positioning node and the $(i+1)^{th}$ positioning node and a $j^{th}$ mobile terminal in the two mobile terminals.

i is separately set to each of all integers ranging from 1 to M−1, and j is separately set to 1 or 2.

S505. The two mobile terminals separately send the RSTD to the positioning server.

S506. The positioning server receives the RSTD, and calculates a relative RSTD according to the RSTD.

S507. The positioning server obtains location coordinates of the M positioning nodes.

S508. The positioning server calculates location coordinates of the two mobile terminals according to the relative RSTD, the location coordinates of the M positioning nodes, and a preset positioning equation.

The preset positioning equation includes:

$$[\sqrt{(a_i-x_1)^2+(b_i-y_1)^2}-\sqrt{(a_{i+1}-x_1)^2+(b_{i+1}-y_1)^2}]-[\sqrt{(a_i-x_2)^2+(b_i-y_2)^2}-\sqrt{(a_{i+1}-x_2)^2+(b_{i+1}-y_2)^2}]=\text{RelativeRSTD}_{i,i+1}\times c,$$

where $(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, RelativeRSTD$_{i, i+1}$ indicates the relative RSTD between the $i^{th}$ positioning node and the $(i+1)^{th}$ positioning node and the two mobile terminals, and c indicates a speed of light.

In the positioning method provided in this embodiment of the present invention, when the two mobile terminals are introduced, the relative RSTD is introduced by performing a subtraction operation between actually measured RSTDs of the two mobile terminals, to eliminate a TAE. Then, positioning calculation is performed on the mobile terminals based on the relative RSTD, to eliminate a positioning error brought by the TAE, and improve positioning precision. In addition, the locations of the two mobile terminals may be obtained after a once-through operation. Further, when multiple (>2) mobile terminals exist in a system, the positioning method provided in this embodiment of the present invention is repeatedly implemented for all combinations of two of the multiple mobile terminals, so as to position all the multiple mobile terminals in the system.

In conclusion, according to the positioning method provided in this embodiment of the present invention, the positioning error brought by the TAE can be eliminated, the positioning precision can be improved, and the multiple mobile terminals can be accurately positioned at a time.

Embodiment 4

Figure 6:
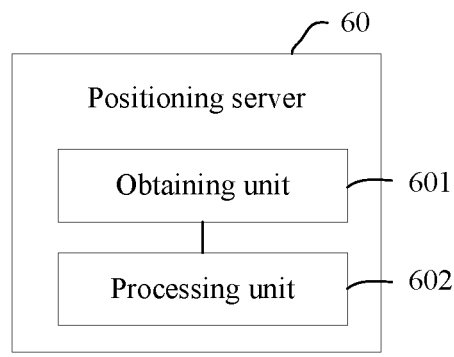
FIG. 6 is a schematic structural diagram of a positioning server according to an embodiment of the present invention.

This embodiment of the present invention provides a positioning server 60. Specifically, as shown in FIG. 6, the positioning server 60 includes an obtaining unit 601 and a processing unit 602.

The obtaining unit 601 is configured to separately obtain location coordinates of M positioning nodes. M is an integer and M≥5.

The obtaining unit 601 is further configured to separately obtain an RSTD between an $i^{th}$ positioning node and an $(i+1)^{th}$ positioning node in the M positioning nodes and a $j^{th}$ mobile terminal in two mobile terminals. i is separately set to each of all integers ranging from 1 to M−1, and j is separately set to 1 or 2.

The processing unit 602 is configured to determine a relative RSTD according to the RSTD. The relative RSTD indicates a difference between an RSTD between the $i^{th}$ positioning node and the $(i+1)^{th}$ positioning node and a first mobile terminal in the two mobile terminals and an RSTD between the $i^{th}$ positioning node and the $(i+1)^{th}$ positioning node and a second mobile terminal in the two mobile terminals.

The processing unit 602 is further configured to determine location coordinates of the two mobile terminals according to the relative RSTD and the location coordinates of the M positioning nodes.

Preferably, in the positioning server 60 provided in this embodiment of the present invention, the processing unit 602 is specifically configured to: determine the location coordinates of the two mobile terminals according to the relative RSTD, the location coordinates of the M positioning nodes, and a preset positioning equation, where the preset positioning equation includes:

$$[\sqrt{(a_i-x_1)^2+(b_i-y_1)^2}-\sqrt{(a_{i+1}-x_1)^2+(b_{i+1}-y_1)^2}]-[\sqrt{(a_i-x_2)^2+(b_i-y_2)^2}-\sqrt{(a_{i+1}-x_2)^2+(b_{i+1}-y_2)^2}]=\text{RelativeRSTD}_{i,i+1}\times c,$$

where $(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, RelativeRSTD$_{i, i+1}$ indicates the relative RSTD between the $i^{th}$ positioning node and the $(i+1)^{th}$ positioning node and the two mobile terminals, and c indicates a speed of light.

In a possible implementation, the obtaining unit 601 may be specifically configured to: separately receive ToAs sent by the M positioning nodes, where the ToAs of uplink pilot signals are obtained by the M positioning nodes by separately measuring the uplink pilot signals sent by the two mobile terminals; and determine an RSTD between the $i^{th}$ positioning node and the $(i+1)^{th}$ positioning node and the $j^{th}$ mobile terminal in the two mobile terminals according to the ToAs of the uplink pilot signals.

Figure 7:
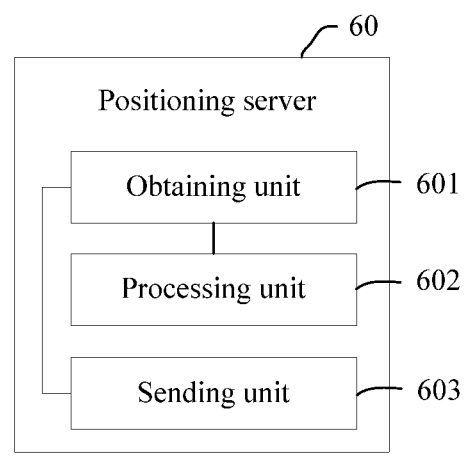
FIG. 7 is a schematic structural diagram of another positioning server according to an embodiment of the present invention.

Preferably, as shown in FIG. 7, the positioning server 60 may further include a sending unit 603.

The sending unit 603 is configured to: before the obtaining unit 601 separately receives the ToAs sent by the M positioning nodes, separately send a first message to the two mobile terminals, so that the two mobile terminals simultaneously send the uplink pilot signals to the M positioning nodes.

Further, the obtaining unit 601 is further configured to: before the sending unit 603 separately sends the first message to the two mobile terminals, separately obtain uplink pilot signal configurations of the two mobile terminals.

The sending unit 603 is further configured to separately send the uplink pilot signal configurations of the two mobile terminals to the M positioning nodes, so that the M positioning nodes receive the uplink pilot signals according to the uplink pilot signal configurations, and measure the uplink pilot signals.

In another possible implementation, the obtaining unit may be specifically configured to: separately receive an RSTD that is between the $i^{th}$ positioning node and the $(i+1)^{th}$ positioning node and the $j^{th}$ mobile terminal in the two mobile terminals and that is separately sent by the two mobile terminals, where the RSTD is obtained by the two mobile terminals by separately measuring downlink pilot signals sent by the M positioning nodes.

Preferably, as shown in FIG. 7, the positioning server 60 may further include a sending unit 603.

The sending unit 603 is configured to separately send a second message to the M positioning nodes, so that the M positioning nodes simultaneously send the downlink pilot signals to the two mobile terminals.

Specifically, for a method for positioning a mobile terminal by using the positioning server 60 provided in this embodiment of the present invention, refer to the descriptions in Embodiment 1. Details are not described again in this embodiment of the present invention.

According to the positioning server provided in this embodiment of the present invention, the two mobile terminals are introduced, and the relative RSTD is introduced by performing a subtraction operation between the actually measured RSTDs of the two mobile terminals, to eliminate a TAE. Then, positioning calculation is performed on the mobile terminals based on the relative RSTD, to eliminate a positioning error brought by the TAE, and improve positioning precision. In addition, the locations of the two mobile terminals may be obtained after a once-through operation. Further, when multiple (>2) mobile terminals exist in a system, multiple operations are performed on all combinations of two of the multiple mobile terminals, so as to position all the multiple mobile terminals in the system. In conclusion, according to the positioning server provided in this embodiment of the present invention, the positioning error brought by the TAE can be eliminated, the positioning precision can be improved, and the multiple mobile terminals can be accurately positioned at a time.

Embodiment 5

Figure 8:
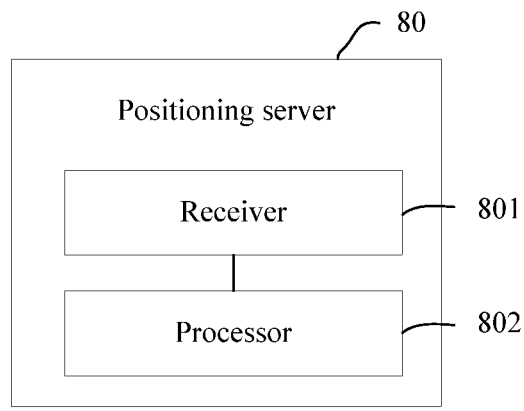
FIG. 8 is a schematic structural diagram of a positioning server according to an embodiment of the present invention.

This embodiment of the present invention provides a positioning server 80. Specifically, as shown in FIG. 8, the positioning server 80 includes a receiver 801 and a processor 802.

The receiver 801 is configured to separately obtain location coordinates of M positioning nodes. M is an integer and M≥5.

The receiver 801 is further configured to separately obtain a reference signal time difference RSTD between an $i^{th}$ positioning node and an $(i+1)^{th}$ positioning node in the M positioning nodes and a $j^{th}$ mobile terminal in two mobile terminals. i is separately set to each of all integers ranging from 1 to M−1, and j is separately set to 1 or 2.

The processor 802 is configured to determine a relative RSTD according to the RSTD. The relative RSTD indicates a difference between an RSTD between the $i^{th}$ positioning node and the $(i+1)^{th}$ positioning node and a first mobile terminal in the two mobile terminals and an RSTD between the $i^{th}$ positioning node and the $(i+1)^{th}$ positioning node and a second mobile terminal in the two mobile terminals.

The processor 802 is further configured to determine location coordinates of the two mobile terminals according to the relative RSTD and the location coordinates of the M positioning nodes.

In a possible implementation, the receiver 801 may be specifically configured to: separately receive times of arrival ToAs that are of uplink pilot signals and that are sent by the M positioning nodes, where the ToAs of the uplink pilot signals are obtained by the M positioning nodes by separately measuring the uplink pilot signals sent by the two mobile terminals; and determine an RSTD between the $i^{th}$ positioning node and the $(i+1)^{th}$ positioning node and the $j^{th}$ mobile terminal in the two mobile terminals according to the ToAs of the uplink pilot signals.

Figure 9:
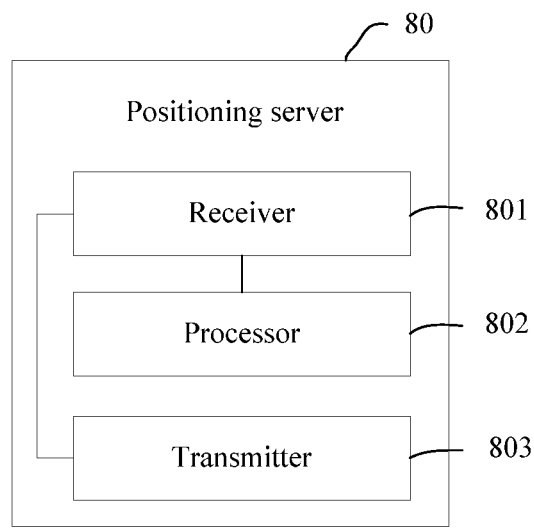
FIG. 9 is a schematic structural diagram of another positioning server according to an embodiment of the present invention.

Further, as shown in FIG. 9, the positioning server 80 may further include a transmitter 803.

The transmitter 803 is configured to: before the receiver 801 separately receives the times of arrival ToAs that are of the uplink pilot signals and that are sent by the M positioning nodes, separately send a first message to the two mobile terminals, so that the two mobile terminals simultaneously send the uplink pilot signals to the M positioning nodes.

Further, in the positioning server 80 provided in this embodiment of the present invention, the receiver 801 is further configured to: before the transmitter 803 separately sends the first message to the two mobile terminals, separately obtain uplink pilot signal configurations of the two mobile terminals.

The transmitter 803 is further configured to separately send the uplink pilot signal configurations of the two mobile terminals to the M positioning nodes, so that the M positioning nodes receive the uplink pilot signals according to the uplink pilot signal configurations, and measure the uplink pilot signals.

In another possible implementation, the receiver 801 may be specifically configured to: separately receive an RSTD that is between the $i^{th}$ positioning node and the $(i+1)^{th}$ positioning node and the $j^{th}$ mobile terminal in the two mobile terminals and that is separately sent by the two mobile terminals, where the RSTD is obtained by the two mobile terminals by separately measuring downlink pilot signals sent by the M positioning nodes.

Further, as shown in FIG. 9, the positioning server 80 may further include a transmitter 803.

The transmitter 803 is configured to: before the receiver 801 separately receives the RSTD that is between the $i^{th}$ positioning node and the $(i+1)^{th}$ positioning node and the $j^{th}$ mobile terminal in the two mobile terminals and that is separately sent by the two mobile terminals, separately send a second message to the M positioning nodes, so that the M positioning nodes simultaneously send the downlink pilot signals to the two mobile terminals.

Preferably, in the positioning server 80 provided in this embodiment of the present invention, the processor 802 may be specifically configured to: determine the location coordinates of the two mobile terminals according to the relative RSTD, the location coordinates of the M positioning nodes, and a preset positioning equation, where the preset positioning equation includes:

$$[\sqrt{(a_i-x_1)^2+(b_i-y_1)^2}-\sqrt{(a_{i+1}-x_1)^2+(b_{i+1}-y_1)^2}]-[\sqrt{(a_i-x_2)^2+(b_i-y_2)^2}-\sqrt{(a_{i+1}-x_2)^2+(b_{i+1}-y_2)^2}]=\text{RelativeRSTD}_{i,i+1}\times c,$$

where $(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, RelativeRSTD$_{i, i+1}$ indicates the relative RSTD between the $i^{th}$ positioning node and the $(i+1)^{th}$ positioning node and the two mobile terminals, and c indicates a speed of light.

Specifically, for a method for positioning a mobile terminal by using the positioning server 80 provided in this embodiment of the present invention, refer to the descriptions in Embodiment 1. Details are not described again in this embodiment of the present invention.

According to the positioning server provided in this embodiment of the present invention, the two mobile terminals are introduced, and the relative RSTD is introduced by performing a subtraction operation between the actually measured RSTDs of the two mobile terminals, to eliminate a TAE. Then, positioning calculation is performed on the mobile terminals based on the relative RSTD, to eliminate a positioning error brought by the TAE, and improve positioning precision. In addition, the locations of the two mobile terminals may be obtained after a once-through operation. Further, when multiple (>2) mobile terminals exist in a system, multiple operations are performed on all combinations of two of the multiple mobile terminals, so as to position all the multiple mobile terminals in the system. In conclusion, according to the positioning server provided in this embodiment of the present invention, the positioning error brought by the TAE can be eliminated, the positioning precision can be improved, and the multiple mobile terminals can be accurately positioned at a time.

Embodiment 6

This embodiment of the present invention provides a positioning system, including the positioning server described in Embodiment 4, M positioning nodes, and N mobile terminals.

M and N are integers, M≥5, and N≥2.

The positioning server may be an independent network node or may be located inside another network node. That is, the positioning server may be logical or physical. Specifically, in a 2G/3G mobile communications technology, the positioning server is an SMLC. In an LTE technology, the positioning server is an E-SMLC, and may be specifically a network node of an access network or a core network node. This is not specifically limited in this embodiment of the present invention.

The positioning node is a network node of an access network, and may be specifically a NodeB, an eNodeB, a family NodeB, a family eNodeB, or the like. This is not specifically limited in this embodiment of the present invention.

The mobile terminal may be specifically a communications apparatus, such as a mobile phone, a cellular phone, or a notebook computer that has a wireless access capability. This is not specifically limited in this embodiment of the present invention.

Specifically, for a method for positioning a mobile terminal by using the positioning system provided in this embodiment of the present invention, refer to the descriptions in Embodiment 2 and Embodiment 3. Details are not described again in this embodiment of the present invention.

In the positioning system provided in this embodiment of the present invention, multiple mobile terminals are introduced, and a relative RSTD is introduced by performing a subtraction operation between actually measured RSTDs of all combinations of two of the multiple mobile terminals, to eliminate a TAE. Then, positioning calculation is performed on the mobile terminals based on the relative RSTD, to eliminate a positioning error brought by the TAE, and improve positioning precision. In addition, multiple operations are performed, so as to position all the multiple mobile terminals in the system. In conclusion, according to the positioning system provided in this embodiment of the present invention, the positioning error brought by the TAE can be eliminated, the positioning precision can be improved, and the multiple mobile terminals can be accurately positioned at a time.

It may be clearly understood by a person skilled in the art that, for the purpose of convenient and brief description, in the apparatus described above, division of the foregoing function modules is merely taken as an example for illustration. In actual application, the foregoing functions can be allocated to different function modules and implemented according to a requirement, that is, an internal structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may be or may not be physically separate, and parts displayed as units may be or may not be physical units, may be located in one position, or may be distributed on multiple network units. Some or all of the units may be selected according to actual requirements to implement the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   separately obtaining, by a positioning server, location coordinates of M positioning nodes;
   for each combination of integer values of i and integer values of j, separately obtaining, by the positioning server, a reference signal time difference (RSTD) between an $i^{th}$ positioning node and an $(i+1)^{th}$ positioning node of the M positioning nodes and a $j^{th}$ mobile terminal of two mobile terminals, wherein M is an integer and M≥5, i is separately set to each integer from 1 to M−1, and j is separately set to 1 and 2, and wherein separately obtaining the RSTD between the $i^{th}$ positioning node and the $(i+1)^{th}$ positioning node of the M positioning nodes and the $j^{th}$ mobile terminal of two mobile terminals comprises:
   separately sending, by the positioning server, a first message to the two mobile terminals, causing the two mobile terminals to simultaneously send uplink pilot signals to the M positioning nodes;
   separately receiving, by the positioning server, times of arrival (ToAs) of the uplink pilot signals that are sent by the M positioning nodes, wherein the ToAs of the uplink pilot signals are obtained by the M positioning nodes by separately measuring the uplink pilot signals sent by the two mobile terminals; and
   for each combination of integer values of i and integer values of j, determining, by the positioning server, the RSTD between the $i^{th}$ positioning node and the $(i+1)^{th}$ positioning node and the $j^{th}$ mobile terminal in the two mobile terminals according to the ToAs of the uplink pilot signals;
   for each integer value of i, determining, by the positioning server, a relative RSTD corresponding to the respective integer value of i according to the obtained RSTDs corresponding to the respective integer value of i, wherein each respective relative RSTD corresponding to a respective integer of i is obtained by performing a subtraction operation on a respective RSTD between the $i^{th}$ positioning node and the $(i+1)^{th}$ positioning node and a first mobile terminal of the two mobile terminals and a respective RSTD between the $i^{th}$ positioning node and the $(i+1)^{th}$ positioning node and a second mobile terminal of the two mobile terminals; and
   determining, by the positioning server, location coordinates of the two mobile terminals according to the determined relative RSTDs of each integer value of i and the location coordinates of the M positioning nodes.

2. The method according to claim 1, wherein before separately sending the first message to the two mobile terminals, the method further comprises:
   separately obtaining, by the positioning server, uplink pilot signal configurations of the two mobile terminals; and
   separately sending, by the positioning server, the uplink pilot signal configurations of the two mobile terminals to the M positioning nodes, so that the M positioning nodes receive the uplink pilot signals according to the uplink pilot signal configurations, and measure the uplink pilot signals.

3. The method according to claim 1, wherein determining, by the positioning server, the location coordinates of the two mobile terminals according to the determined relative RSTDs and the location coordinates of the M positioning nodes comprises:
   determining, by the positioning server, the location coordinates of the two mobile terminals according to the determined relative RSTDs, the location coordinates of the M positioning nodes, and a preset positioning equation, wherein the preset positioning equation comprises:

$$[\sqrt{(a_i-x_1)^2+(b_i-y_1)^2} - \sqrt{(a_{i+1}-x_1)^2+(b_{i+1}-y_1)^2}] - [\sqrt{(a_i-x_2)^2+(b_i-y_2)^2} - \sqrt{(a_{i+1}-x_2)^2+(b_{i+1}-y_2)^2}] = \text{RelativeRSTD}_{i,i+1} \times c,$$

wherein
($a_i$, $b_i$) indicates location coordinates of the $i^{th}$ positioning node, ($a_{i+1}$, $b_{i+1}$) indicates location coordinates of the $(i+1)^{th}$ positioning node, ($x_1$, $y_1$) indicates location coordinates of the first mobile terminal, ($x_2$, $y_2$) indicates location coordinates of the second mobile terminal, RelativeRSTD$_{i,\ i+1}$ indicates the relative RSTD between the $i^{th}$ positioning node and the $(i+1)^{th}$ positioning node and the two mobile terminals, and c indicates a speed of light.

4. A positioning server, comprising:
a transmitter;
a receiver;
a processor; and
a computer-readable storage medium storing a program to be executed by the processor, the program including instructions for:
separately obtaining location coordinates of M positioning nodes, wherein M is an integer and M≥5;
for each combination of integer values of i and integers values of j, separately obtaining a reference signal time difference (RSTD) between an $i^{th}$ positioning node and an $(i+1)^{th}$ positioning node in the M positioning nodes and a $j^{th}$ mobile terminal of two mobile terminals, wherein i is separately set to each integer from 1 to M−1, and j is separately set to 1 and 2, and wherein separately obtaining the RSTD between the between the $i^{th}$ positioning node and the $(i+1)^{th}$ positioning node in the M positioning nodes and the $j^{th}$ mobile terminal of the two mobile terminals comprises:
separately sending, using the transmitter, a first message to the two mobile terminals, causing the two mobile terminals to simultaneously send uplink pilot signals to the M positioning nodes;
separately receiving, using the receiver, times of arrival (ToAs) of the uplink pilot signals that are sent by the M positioning nodes, wherein the ToAs of the uplink pilot signals are obtained by the M positioning nodes by separately measuring the uplink pilot signals sent by the two mobile terminals; and
for each combination of integer values of i and integers values of j, determining an RSTD between the $i^{th}$ positioning node and the $(i+1)^{th}$ positioning node and the $j^{th}$ mobile terminal in the two mobile terminals according to the ToAs of the uplink pilot signals;
for each integer value of i, determining a relative RSTD corresponding to the respective integer value of i according to the obtained RSTDs corresponding to the respective integer value of i, wherein each respective relative RSTD corresponding to a respective integer of I is obtained by performing a subtraction operation on a respective RSTD between the $i^{th}$ positioning node and the $(i+1)^{th}$ positioning node and a first mobile terminal of the two mobile terminals and a respective RSTD between the $i^{th}$ positioning node and the $(i+1)^{th}$ positioning node and a second mobile terminal of the two mobile terminals; and
determining location coordinates of the two mobile terminals according to the determined relative RSTDs of each integer value of i and the location coordinates of the M positioning nodes.

5. The positioning server according to claim 4, wherein the program further includes instructions for:
separately obtaining uplink pilot signal configurations of the two mobile terminals; and
sending, using the transmitter, the uplink pilot signal configurations of the two mobile terminals to the M positioning nodes, so that the M positioning nodes receive the uplink pilot signals according to the uplink pilot signal configurations, and measure the uplink pilot signals.

6. The positioning server according to claim 4, wherein the program further includes instructions for:
determining the location coordinates of the two mobile terminals according to the determined relative RSTDs, the location coordinates of the M positioning nodes, and a preset positioning equation, wherein the preset positioning equation comprises:

$$[\sqrt{(a_i-x_1)^2+(b_i-y_1)^2}-\sqrt{(a_{i+1}-x_1)^2+(b_{i+1}-y_1)^2}]-[\sqrt{(a_i-x_2)^2+(b_i-y_2)^2}-\sqrt{(a_{i+1}-x_2)^2+(b_{i+1}-y_2)^2}]=\text{RelativeRSTD}_{i,i+1}\times c,$$

wherein
$(a_i, b_i)$ indicates location coordinates of the $i^{th}$ positioning node, $(a_{i+1}, b_{i+1})$ indicates location coordinates of the $(i+1)^{th}$ positioning node, $(x_1, y_1)$ indicates location coordinates of the first mobile terminal, $(x_2, y_2)$ indicates location coordinates of the second mobile terminal, RelativeRSTD$_{i,\ i+1}$ indicates the relative RSTD between the $i^{th}$ positioning node and the $(i+1)^{th}$ positioning node and the two mobile terminals, and c indicates a speed of light.

7. A positioning system, comprising:
M positioning nodes, wherein M is an integer and M≥5; and
a server, comprising:
a processor; and
a computer-readable storage medium storing a program to be executed by the processor, the program including instructions for:
obtaining location coordinates of the M positioning nodes;
for each combination of integer values of i and integers values of j, separately obtaining a reference signal time difference (RSTD) between an $i^{th}$ positioning node and an $(i+1)^{th}$ positioning node in the M positioning nodes and a $j^{th}$ mobile terminal of two mobile terminals, wherein i is separately set to each integer from 1 to M−1, and j is separately set to 1 and 2, and wherein separately obtaining the RSTD between the between the $i^{th}$ positioning node and the $(i+i)^{th}$ positioning node in the M positioning nodes and the $j^{th}$ mobile terminal of the two mobile terminals comprises:
separately sending, using the transmitter, a first message to the two mobile terminals, causing the two mobile terminals to simultaneously send uplink pilot signals to the M positioning nodes;
separately receiving, using the receiver, times of arrival (ToAs) of the uplink pilot signals that are sent by the M positioning nodes, wherein the ToAs of the uplink pilot signals are obtained by the M positioning nodes by separately measuring the uplink pilot signals sent by the two mobile terminals; and
for each combination of integer values of i and integers values of j, determining an RSTD between the $i^{th}$ positioning node and the $(i+1)^{th}$ positioning node and the $j^{th}$ mobile terminal in the two mobile terminals according to the ToAs of the uplink pilot signals;
for each integer value of i, determining a relative RSTD corresponding to the respective integer value of i according to the obtained RSTDs corresponding to the respective integer value of i, wherein each respective relative RSTD indicates a difference between an RSTD between the $i^{th}$ positioning node and the $(i+1)^{th}$ positioning node and a first mobile terminal of the two mobile terminals and an RSTD between the $i^{th}$ positioning node and the $(i+i)^{th}$ positioning node and a second mobile terminal of the two mobile terminals; and determining location coordinates of the two mobile terminals according to the determined relative RSTDs of each integer value of i and the location coordinates of the M positioning nodes.

8. The positioning system according to claim 7, wherein the program further includes instructions for:

separately obtaining uplink pilot signal configurations of the two mobile terminals; and separately sending the uplink pilot signal configurations of the two mobile terminals to the M positioning nodes, so that the M positioning nodes receive the uplink pilot signals according to the uplink pilot signal configurations, and measure the uplink pilot signals.

* * * * *